May 3, 1927.
R. D. MacLAURIN ET AL
1,626,853
METHOD OF GARBAGE REDUCTION
Filed March 3, 1926
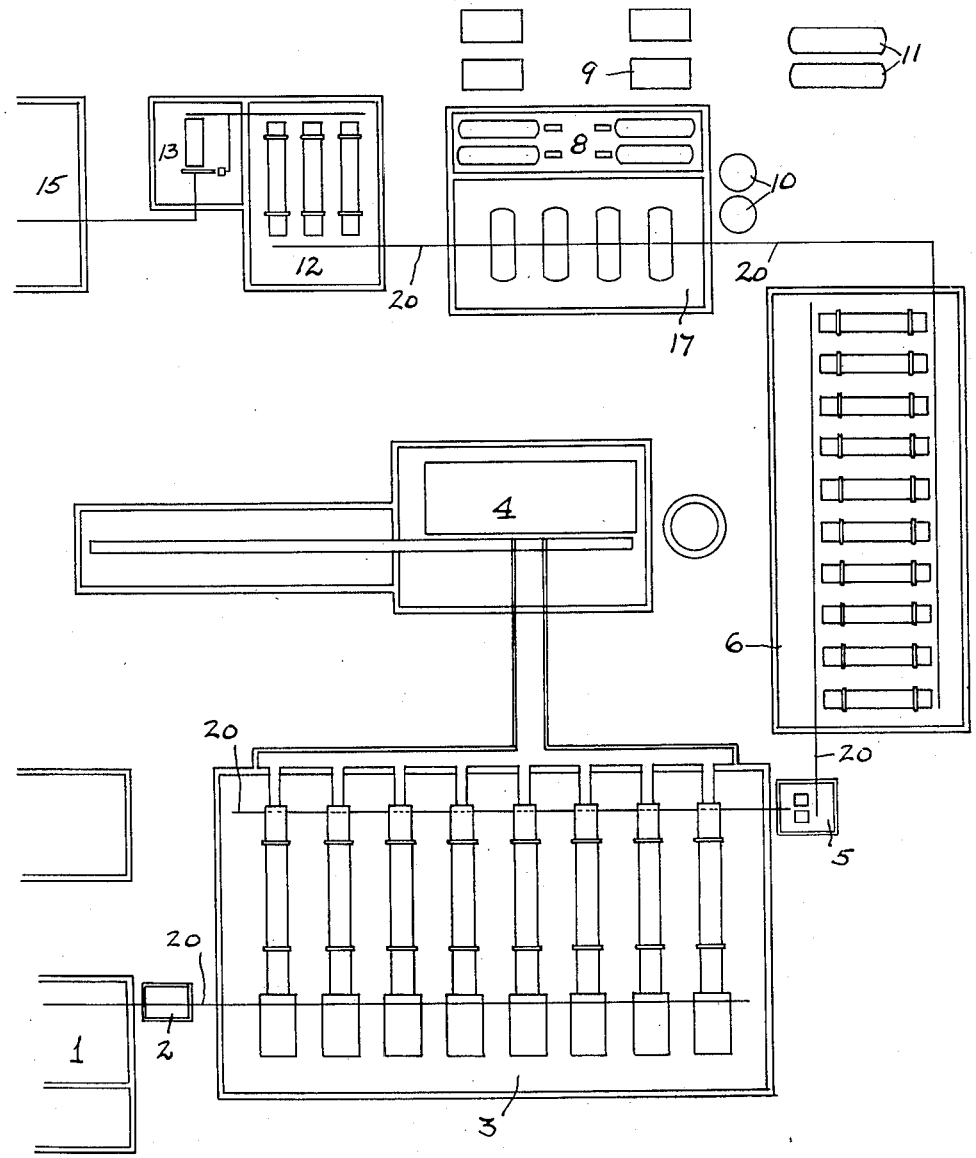
INVENTORS
Robert D. MacLaurin and
BY Charles C. Smith
Fay, Oberlin & Fay
ATTORNEYS.

Patented May 3, 1927.

1,626,853

UNITED STATES PATENT OFFICE.

ROBERT D. MacLAURIN, OF LAKEWOOD, AND CHARLES C. SMITH, OF CLEVELAND, OHIO.

METHOD OF GARBAGE REDUCTION.

Application filed March 3, 1926. Serial No. 91,960.

The present invention relates to garbage reduction and more particularly to a process for economically treating and handling the garbage so as to recover the valuable by-products and at the same time to so handle the garbage as to prevent nuisance from noxious gases and water carried solid or liquid wastes. Heretofore the more economical methods of garbage reduction have resulted in nuisance features such as noxious gases and water carried solid or liquid wastes, while the methods which eliminate the nuisance features have sacrificed economy. In the present method the green garbage is dehydrated without burning or charring and after being completely dehydrated has the grease and fats removed and the remainder is handled to produce the usual tankage or fertilizer. To the accomplishment of the foregoing and related ends, said invention, then, consists of the steps hereinafter fully described and particularly pointed out in the claims.

The annexed drawing and the following description set forth in detail one approved method of carrying out the invention, such disclosed mode, however, constituting but one of the various ways in which the principle of the invention may be used.

In said annexed drawing:—

The single figure there appearing is a diagrammatic layout of a plant embodying the present method.

The present reduction process, as shown by the drawing which diagrammatically shows a complete plant layout, provides a direct heat dehydrator 3 into which the garbage is first carried from a storage tank 1, the garbage first passing through a rotary filter 2, which removes the free water from the green garbage. In the direct heat dehydrator, which is preferably of the rotating cylinder type, the green garbage is dehydrated from its normal moisture content of about 72 per cent to about 35 per cent. Such preliminary dehydration can ordinarily be effected by a direct heat dehydrator without causing any nuisance, but should noxious gas be produced, these are readily burned by passing them through the rubbish incinerator unit 4, this unit being also adaptable for the production of steam for the other steps in the process.

When the green garbage has been dehydrated to about 35 per cent of moisture, it is passed into a separating and disintegrating unit 5, in which it is first hand sorted to remove foreign matter, and then passed over a magnetic separator for the removal of iron and steel such as cans and the like, and is then disintegrated or reduced to a fairly fine condition ready for further treatment.

From this unit the disintegrated material is passed into a steam tube drier 6 for further dehydration and here the moisture content is reduced to about 10 per cent which is the normally dry point of the garbage. This dehydration in steam tube driers eliminates the production of noxious gases and also prevents the carbonization or burning of the material. This further dehydration from 35 per cent to about 10 per cent of moisture is rapidly carried out in the steam tube driers provided that the material has been properly disintegrated and the prevention of charring or partially burning of the garbage conserves the value of the garbage both as to the grease to be extracted and the leftover tankage or fertilizer.

From the steam tube driers, the dried garbage is charged into the extractor 7, which may be of any suitable type, that illustrated being a suitable percolator and the extraction material such as naphtha is added, and the grease and fats are removed, steam being used for the evaporation of the solvent. In the plant illustrated, there are shown the stills 8, condensers 9, grease storage tanks 10, and solvent storage tanks 11.

After the grease is extracted, the tankage is passed into a second steam tube drier 12, which removes the moisture taken up from the steam used in evaporating the solvent and then the material is passed into a grinder or mill 13 in which it is first screened and then reduced to the desired fineness before passing into the tankage storage tanks 15.

The present plant layout is shown as being built around the central unit which is the rubbish incinerator, or steam producer, and the garbage is handled on conveyors 20 which are diagrammatically illustrated. By using conveyors, handling cost is reduced and the process may be continuously carried out. By the present process, the economy of the usual fire drying process is obtained as the steam tube driers are substantially as efficient for the final dehydration as a direct heat drier when the material is properly disintegrated after the preliminary dehydration.

The loss of solvent or grease extraction material is kept at a minimum as no solvent is added to the garbage until final drying has been accomplished and thus the extraction is carried out as a separate step. By preventing burning or carbonization of the material, the value of the tankage and the grease is maintained at its highest point. If at any time noxious odors are produced in the direct heat dehydrator, these are easily prevented from becoming a nuisance by being burned in the rubbish incinerator which is also used to produce steam for the steam tube driers and the grease extraction step.

The use of the steam tube drier for reducing the moisture content from thirty-five per cent (35) to about ten per cent (10) presents several very advantageous features. This dehydration is the critical part of direct heat drying as it is during this process that noxious gases are formed and the material is burned or scorched. Where reducers are used after preliminary drying, the larger losses of solvents occur during the further reduction and removal of water. In the present method, the second dehydration is accomplished without danger of burning and as no solvent is present, there are no losses during this step of the process.

This process also eliminates the fire hazard which is present where fire driers are employed to dehydrate from thirty-five per cent (35) to ten per cent (10) moisture as at low moisture content, the liability of fire and explosion is serious. Similarly, the fire hazard is present in reducers as the solvent such as naphtha is an explosive and when the reducers are opened for testing of material, combustible gases are expelled in large quantities.

The entire apparatus can be conveniently grouped so as to economically handle and move the garbage through the several units and the cost of the units themselves is comparatively low as standard types of driers, extractors, etc. may be employed. Powdered fuel can advantageously be employed in the direct heat dehydrator and the incinerator stack 21 used for the gases produced as well as for the incinerator gases themselves.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. In a garbage reduction process, the steps of preliminary dehydration of the green garbage through the non-critical moisture zone by direct heat, then further dehydration through the critical moisture zone by indirect heat, extraction of fats, and the redrying of the tankage by indirect heat.

2. In a garbage reduction process, the steps of preliminary dehydration of the green garbage through the non-critical moisture zone by direct heat, distintegration of preliminary dried garbage, further dehydration through the critical moisture zone by indirect heat, extraction of fats, and redrying of the resultant tankage by indirect heat.

3. In a garbage reduction process, the steps of preliminary dehydration of the green garbage by direct heat from original moisture content to about 35 per cent moisture content, further dehydration by indirect heat from 35 per cent moisture to about 10 per cent moisture, extraction of fats, and redrying of tankage by indirect heat.

4. In a garbage reduction process, the step of critical dehydration of raw garbage from about 35 per cent moisture to about 10 per cent moisture by indirect heat.

5. In a garbage reduction process, the intermediate steps of distintegration of material and then the critical dehydration of such disintegrated raw garbage from about 35 per cent moisture to about 10 per cent moisture by indirect heat.

6. In a garbage reduction process, the steps of first removing free water from the green garbage, then preliminary dehydration of the green garbage by direct heat, then further dehydration by indirect heat, extraction of fats, and the redrying of the tankage by indirect heat.

7. The process of garbage reduction consisting of first removing the free water, then dehydrating the green garbage in a direct heat dehydrator from 75 per cent moisture to about 35 per cent moisture, sorting the partially dehydrated garbage and disintegrating the sorted garbage, further dehydration through the critical zone from about 35 per cent moisture to about 10 per cent moisture in an indirect heat dehydrator, then extracting the fats from the dried garbage, and then redrying the resultant tankage from the extractor in a second indirect heat dehydrator.

Signed by us, this 27th day of February, 1926.

ROBERT D. MacLAURIN.
CHARLES C. SMITH.